Patented Sept. 17, 1935

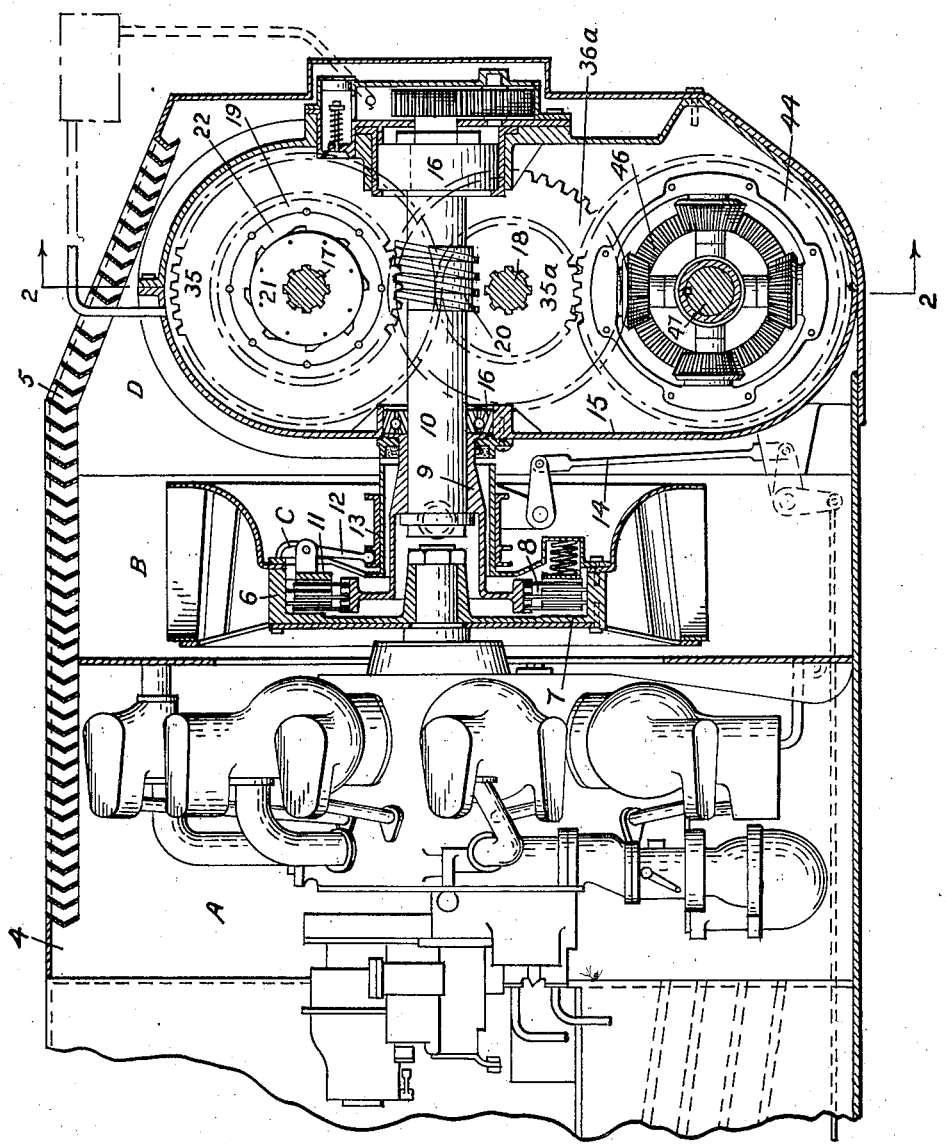

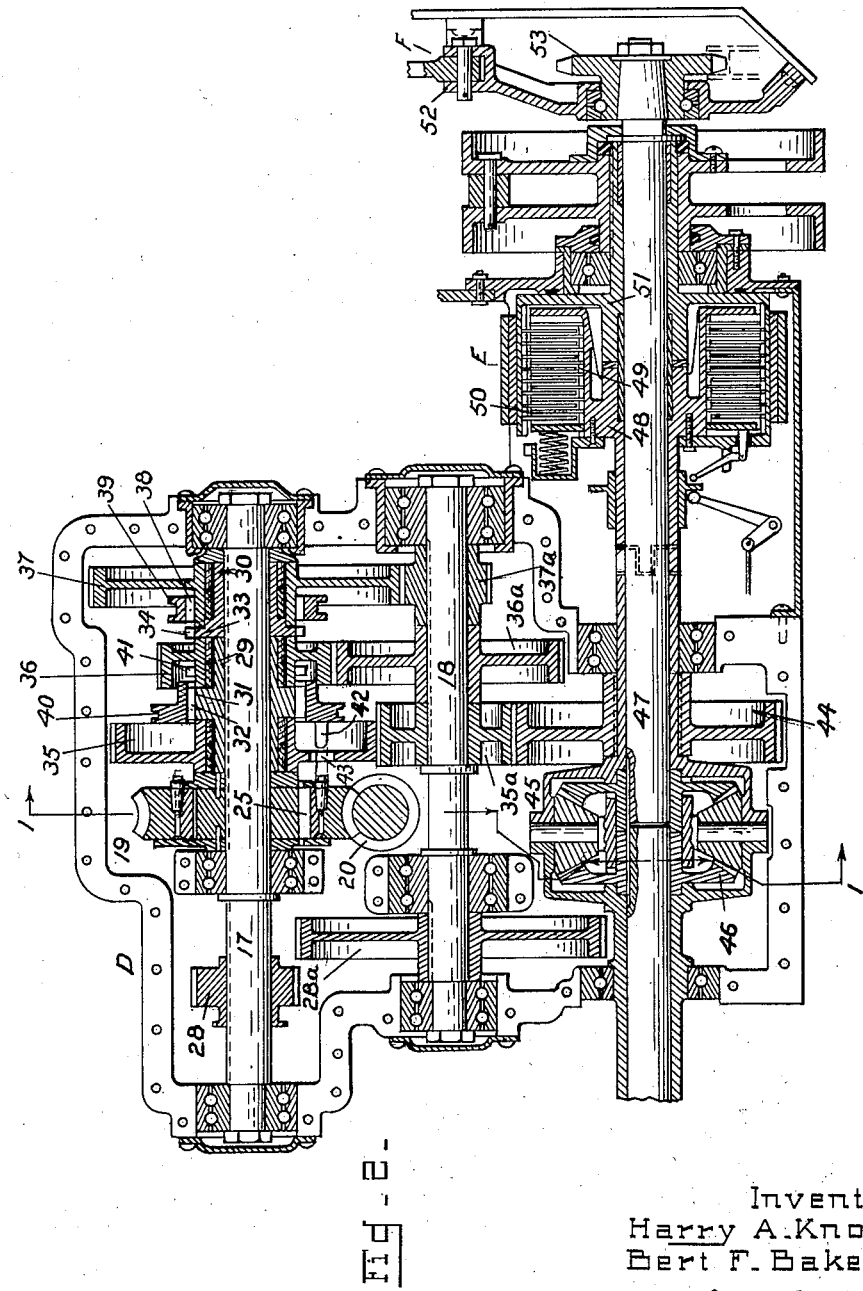

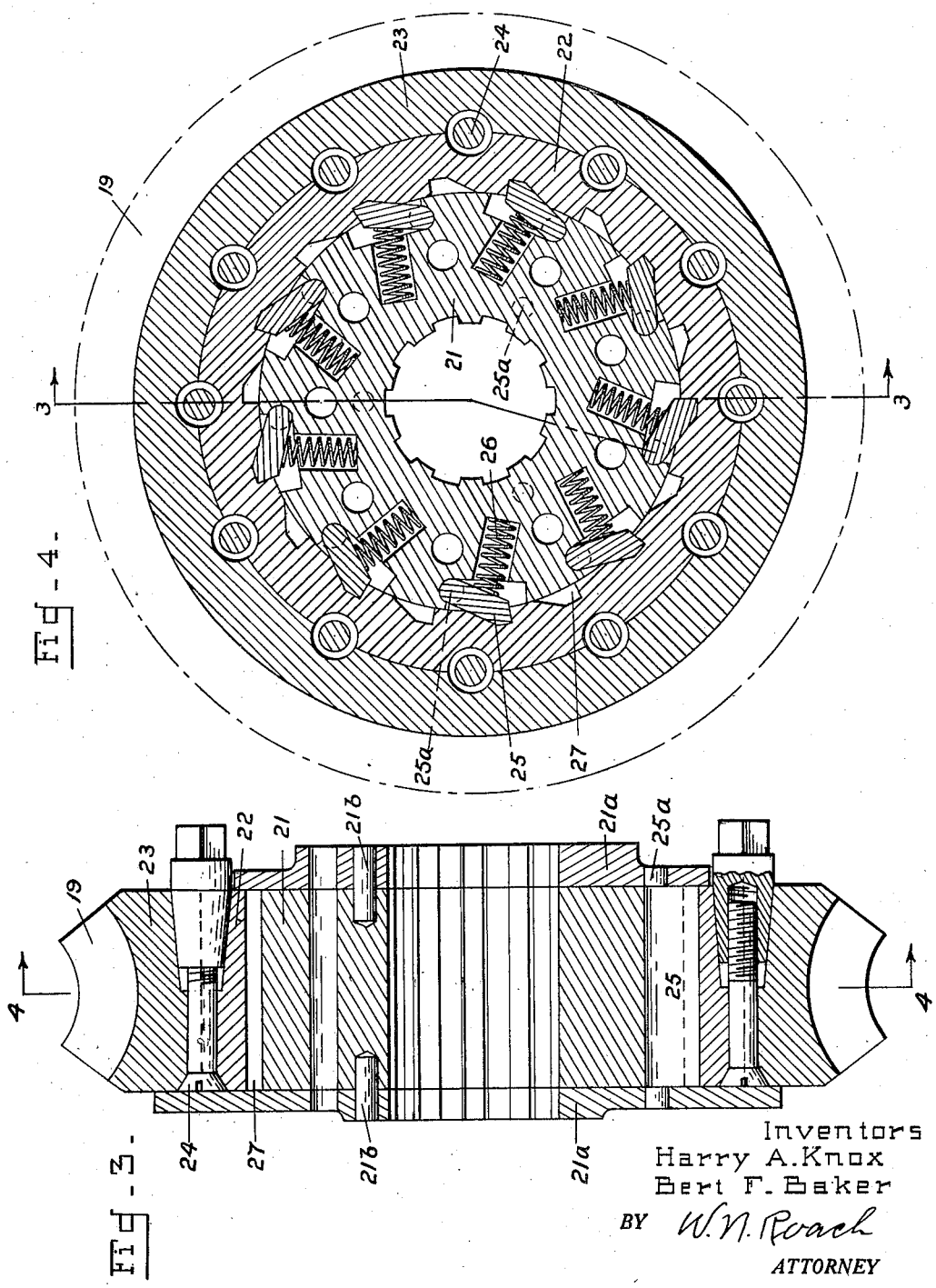

2,014,383

UNITED STATES PATENT OFFICE 2,014,383

POWER TRANSMISSION MECHANISM

Harry A. Knox and Bert F. Baker,
Davenport, Iowa

Original application October 21, 1931, Serial No. 570,140. Divided and this application May 17, 1933, Serial No. 671,556

7 Claims. (Cl. 74—375)

(Granted under the act of March 3, 1883, as amended April 30, 1928; 370 O. G. 757)

The invention described herein may be manufactured and used by or for the Government for governmental purposes, without the payment to us of any royalty thereon.

The subject of this invention is a power transmission mechanism especially adapted for vehicles and is a division of Patent No. 1,919,227 of August 25, 1933.

The invention is characterized by the provision of an over-running clutch in the main worm drive to render free wheeling available for all speeds, a novel compact arrangement of the countershafts of the transmission mechanism to provide constant mesh gears with a common final drive gear, and a novel method of coupling one of the gears of the transmission direct with the main worm wheel to selectively eliminate free wheeling through said gear.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view of the improved transmission taken partly in side elevation and partly on the line 1—1 of Fig. 2.

Fig. 2 is a sectional view on the line 2—2 of Fig. 1.

Fig. 3 is a longitudinal section of the worm wheel on the line 3—3 of Fig. 4.

Fig. 4 is a sectional view on the line 4—4 of Fig. 3.

There is shown a power plant consisting of the following units, motor A, fan B, master clutch C, change speed transmission mechanism D, steering clutches E, and final drive F.

In the illustrated application of the invention the power plant is positioned in the rear end of an armored body 4 of a track-laying vehicle. The body is provided at appropriate points with apertures 5 for the passage of air.

A flywheel 6 fast on the crankshaft of the motor carries the fan B and also one set of discs 7 of the master clutch C. The other set of discs 8 are on a driven member 9 fast on the transmission shaft 10. The pressure plate 11 of the clutch carries a lever 12 engaged in a sliding collar 13 that is actuated by a control system of levers and links 14. The control system is mounted on the front wall of the casing 15 of the transmission mechanism D which is positioned directly in rear of the fan. By virtue of this arrangement the transmission shaft 10 is short enough to avoid the use of universal connections. The shaft is entirely supported in bearings 16—16 in the front and rear walls of the casing 15.

Referring to Fig. 2 the change speed transmission mechanism includes vertically spaced countershafts 17—18, the former being above the transmission shaft 10 and the latter below it. The upper primary countershaft carries a worm wheel 19 meshing with the worm 20 on the transmission shaft. The worm wheel consists of an inner ring 21 (Figs. 3 and 4) splined on the countershaft and an outer ring comprising concentric bands, the inner band 22 being of steel and the outer band 23 being of bronze and formed with the worm teeth. The two bands are held together by a plurality of bolts 24. The coupling between the inner and outer rings is of the over-running clutch type, and is preferably positive consisting of pawls 25 on the inner ring normally urged outwardly by springs 26 to engage ratchet teeth 27 on the inner band 22.

The pawls 25 are preferably pivotally mounted by trunnions 25a inserted in side plates 21a which are secured to the ring 21 by means of pins 21b. The side plates 21 also serve to laterally confine the outer ring.

On one side of the worm wheel 19 is a sliding gear 28 for first speed. A reverse mechanism of conventional type is associated with the sliding gear but for the sake of clarity is not shown in the drawings.

On the other side of the worm wheel 19 a pair of sleeves 29 and 30 are splined on the countershaft. The inside sleeve 29 adjacent the worm wheel is formed with a central annular rib 31 having teeth 32. The outside sleeve 30 has a similar rib 33 at its inner end provided with teeth 34. Gear wheels 35, 36, and 37 are mounted on bearings on the sleeves and are separated by the ribs. The gear 35 is for third speed, the gear 36 for second speed and the gear 37 for fourth speed. The gear 37 has teeth 38 on its hub and a clutch collar 39 engaged therewith is slidable into and out of engagement with the teeth 34 of the rib 33.

A clutch collar 40 on the rib 31 is engageable with teeth 41 on the hub of the gear 36. The clutch collar 40 is also provided with one or more laterally projecting teeth 42 movable into and out of apertures 43 in the gear 35. As indicated in dotted lines in Fig. 2 the teeth 42 may engage only the gear 35 or they may be moved further to the left to engage between the bolts 24 and thereby couple the gear 35 directly to the outer ring of the worm wheel 19. This last position of adjustment will cut out the over-running element of the worm wheel and enable the braking action of the motor to be employed when desired.

The gear wheels 28, 35, 36 and 37 mesh with mating gear wheels 28a, 35a, 36a, and 37a on the lower or second countershaft 18, all except the gear 28 being in constant mesh. The drive is taken through the gear wheel 35a to a gear wheel 44 fast on one side of the housing 45 of a differential gear mechanism. The bevel gears 46—46 of the differential are fast on the divided drive shafts 47—47. The housing 45 is coupled at each side to a sleeve 48 embracing the drive shaft. The sleeve carries one element 49 of the steering clutch E while the other element 50 of the clutch is likewise on a sleeve 51 extending outside the body 5 and terminally carrying a track-driving sprocket wheel 52. The shaft 47 extends beyond the sprocket wheel and carries a smaller sprocket wheel 53.

In operation the drive is normally taken to the four speeds through the over-running clutch. When it is desired to eliminate the free-wheeling and to secure the braking action of the motor through one of the speeds the clutch collar 40 is moved all the way to the left (Fig. 2) so that the teeth 54 will pass through the apertures 43 in the gear 35 and engage the bolts 24 in the outer ring of the worm wheel 31.

We claim:

1. In a power transmission mechanism, a casing, a power shaft mounted in the casing, transverse countershafts, one above and one below the power shaft, gearing including an over-running clutch connecting the power shaft and the upper countershaft, change speed gears on the countershafts, means for coupling one of said gears directly to the gearing including the overrunning clutch, a differential mechanism, and a gear on the lower countershaft for driving the differential.

2. In a power transmission mechanism, a casing, a power shaft mounted in the casing, transverse countershafts, gearing connecting the power shaft and one of the countershafts, constantly meshed gearing connecting the countershafts, a final drive member, and a gear on the final drive in constant mesh with one of the constantly meshed gears of the countershafts.

3. In a power transmission, primary and secondary countershafts, constant mesh change speed gearing connecting the countershafts, means for clutching the gearing of the primary counter shaft to said shaft, and a final drive member geared to one of the constantly meshed gears on the secondary countershaft.

4. In a power transmission mechanism, a driving shaft, a driven shaft, gearing including an over-running clutch connecting the driving shaft and driven shaft, gears free on the driven shaft, means for clutching said gears to the driven shaft and means for additionally connecting one of the free gears to the gearing including the over-running clutch.

5. In a driving transmission mechanism, a power shaft, a driven shaft, gearing including an over-running clutch connecting the driving shaft and driven shaft, a gear on the driven shaft, and a clutch movable to engage the gear and movable additionally to engage the gearing of the over-running clutch.

6. In a power transmission mechanism, a driven shaft, a gear wheel on said shaft including an inner ring fast on the driven shaft, an outer ring on said inner ring and formed of an inner and an outer band, pins holding the bands together, an overrunning clutch coupling between the inner ring and the inner band of the outer ring, means for driving the outer band, a sleeve fast on the driven shaft adjacent the gear wheel, a sliding clutch in driving engagement with the sleeve, laterally projecting members on the clutch, a gear wheel freely mounted on the driven shaft and provided with apertures, the projecting members on the clutch movable into said apertures to couple the clutch and the free gear and additionally movable to also engage the pins of the first mentioned gear wheel.

7. In a power transmission mechanism, a driven shaft, a gear wheel on said shaft including an inner and an outer ring, an overrunning clutch coupling between the inner and outer ring, means for driving the outer ring, a gear wheel mounted on the driven shaft beside the first mentioned gear wheel, and a clutch movable to engage the second mentioned gear wheel to connect it to the driven shaft and movable additionally to also engage the outer ring of the first mentioned gear wheel.

HARRY A. KNOX.
BERT F. BAKER.